United States Patent
Zhao et al.

(10) Patent No.: US 8,170,278 B2
(45) Date of Patent: May 1, 2012

(54) SYSTEM AND METHOD FOR DETECTING AND TRACKING AN OBJECT OF INTEREST IN SPATIO-TEMPORAL SPACE

(75) Inventors: Tao Zhao, Plainsboro, NJ (US); Manoj Aggarwal, Lawrenceville, NJ (US); Changjiang Yang, Belle Mead, NJ (US)

(73) Assignee: SRI International, Menlo Park, CA (US)

( * ) Notice: Subject to any disclaimer, the term of this patent is extended or adjusted under 35 U.S.C. 154(b) by 855 days.

(21) Appl. No.: 12/186,702

(22) Filed: Aug. 6, 2008

(65) Prior Publication Data

US 2010/0034423 A1  Feb. 11, 2010

(51) Int. Cl.
G06K 9/00 (2006.01)
G06K 9/18 (2006.01)

(52) U.S. Cl. ........................................ 382/103; 382/281

(58) Field of Classification Search .......... 382/103–107, 382/236, 284–286, 287, 289, 294–296, 276; 345/629, 648–649, 651, 653, 723; 348/420.1, 348/403.1, 607

See application file for complete search history.

(56) References Cited

U.S. PATENT DOCUMENTS

| | | | | |
|---|---|---|---|---|
| 3,069,654 | A | | 12/1962 | Hough |
| 5,988,863 | A | * | 11/1999 | Demos .......................... 708/203 |
| 6,320,624 | B1 | * | 11/2001 | Ayer et al. ...................... 348/584 |
| 6,340,991 | B1 | * | 1/2002 | Chen et al. ..................... 348/513 |
| 6,904,159 | B2 | * | 6/2005 | Porikli .......................... 382/103 |
| 7,428,345 | B2 | * | 9/2008 | Caspi et al. .................... 382/294 |
| 7,613,325 | B2 | * | 11/2009 | Iwasaki et al. ................. 382/103 |
| 2002/0094135 | A1 | * | 7/2002 | Caspi et al. .................... 382/294 |
| 2007/0242872 | A1 | * | 10/2007 | Rudin et al. .................... 382/154 |
| 2010/0033574 | A1 | * | 2/2010 | Ran et al. ....................... 348/159 |

OTHER PUBLICATIONS

Finalayson etal, "Intrinsic Images by Entropy Minimization", T. Pajdla and J. Matas (Eds.): ECCV 2004, LNCS 3023, pp. 582-595, 2004, Springer-Verlag Berlin Heidelberg.*
Otsuka, K.; Horikoshi, T.; Suzuki, S.; , "Image velocity estimation from trajectory surface in spatiotemporal space," Computer Vision and Pattern Recognition, 1997. Proceedings., 1997 IEEE Computer Society Conference on , vol., No., pp. 200-205, Jun. 17-19, 1997.*
Kawasaki, H.; Ikeuchi, K.; Sakauchi, M.; , "Spatio-temporal analysis of omni image," Computer Vision and Pattern Recognition, 2000. Proceedings. IEEE Conference on , vol. 2, No., pp. 577-584 vol. 2, 2000.*
Bhanu et al., "Kinematic Based Human Motions Analysis in Infrared Sequences." Proceedings of the Sixth IEEE Workshop on Applications of Computer Vision, 208-12 (2002).
Bradski et al., "Computer Vision Face Tracking for Use in a Perceptual User Interface." Intel Technology Journal. vol. 2, No. 2 (1998).
Comaniciu et al., "Kernel-Based Object Tracking." IEEE Transactions on Pattern Analysis and Machine Intelligence. vol. 25, No. 5, pp. 564-575 (2003).

(Continued)

*Primary Examiner* — Andrae S Allison
(74) *Attorney, Agent, or Firm* — Moser Taboada

(57) ABSTRACT

The present invention provides a system and method for detecting and tracking a moving object. First, robust change detection is applied to find initial candidate regions in consecutive frames. These initial detections in consecutive frames are stacked to produce space-time bands which are extracted by Hough transform and entropy minimization based band detection algorithm.

10 Claims, 8 Drawing Sheets

OTHER PUBLICATIONS

DeMenthon et al., "Video Retrieval of Near-Duplicates Using K-Nearest Neighbor Retrieval of Spatiotemporal Descriptors." Multimedia Tools and Applications, vol. 30, No. 3, pp. 229-253 (2006).

Duda et al., "Use of the Hough Transformation to Detect Lines and Curves in Pictures." Comm. ACM. vol. 15, No. 1, pp. 11-15 (1972).

Gonzalez et al., Digital Image Processing 3rd ed., Chapter 9: Morphological Image Processing, pp. 627-688 (Prentice Hall 2008).

Isard et al., "Condensation—Conditional Density Propagation for Visual Tracking." Int'l J. Computer Vision, vol. 29, No. 1, pp. 5-28 (1988).

Kornprobst et al., "Tracking Segmented Objects Using Tensor Voting." Proceedings IEEE Conference on Computer Vision and Pattern Recognition, vol. 2, pp. 118-125 (2000).

Nanda et al., "Probabilistic Template Based Pedestrian Detection in Infrared Videos." IEEE Intelligent Vehicles Symposium, vol. 1, pp. 15-20 (2002).

Press et al., Numerical Recipes in C++: The Art of Scientific Computing 2d ed., pp. 625, 626-628, 634, 662, 664, 666, 671, 686, 699, 808 (Cambridge University Press 2002).

Xu et al., "Pedestrian Detection and Tracking with Night Vision." IEEE Transactions on Intelligent Transportation Systems, vol. 6, No. 1, pp. 63-71 (2005).

Yilmaz et al., "Target Tracking in Airborne Forward Looking Infrared Imagery." Image and Vision Computing Journal, vol. 21, No. 7, pp. 623-635 (2003).

Zhao et al., "Tracking Multiple Humans in Complex Situations." IEEE Transactions on Pattern Analysis and Machine Intelligence, vol. 26, No. 9, pp. 1208-1221 (2004).

\* cited by examiner

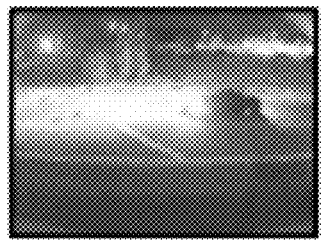
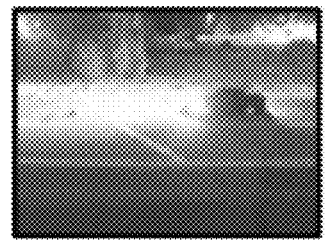
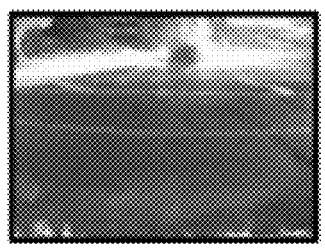
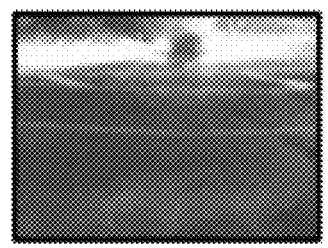
FIG. 2(A)　　　　　　　　　　FIG. 2(B)
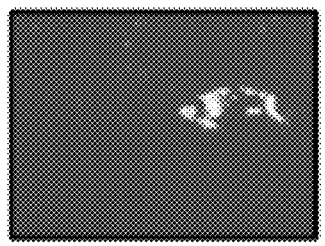
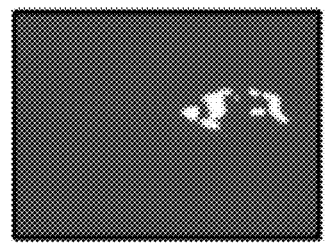
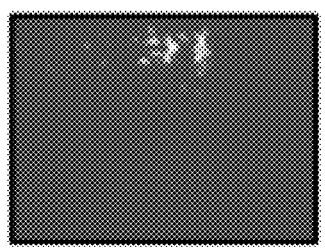
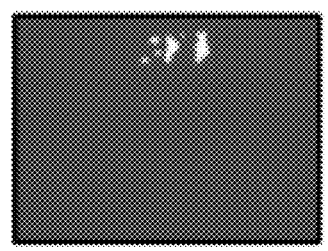
FIG. 2(C)　　　　　　　　　　FIG. 2(D)

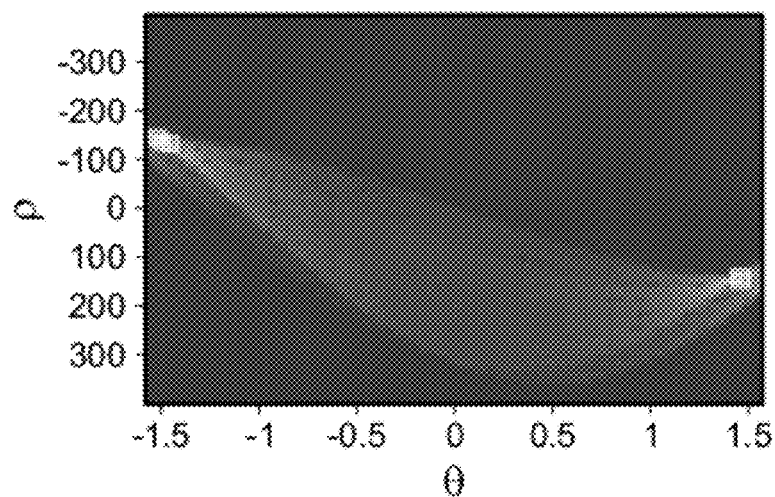
FIG. 3(A)
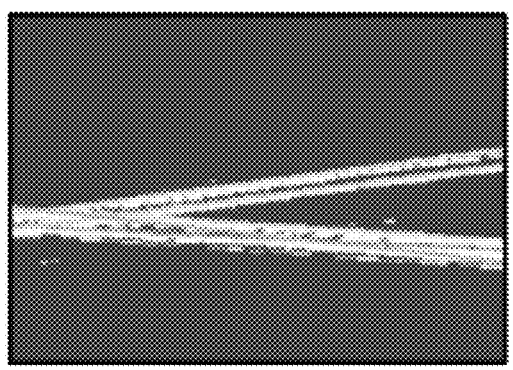 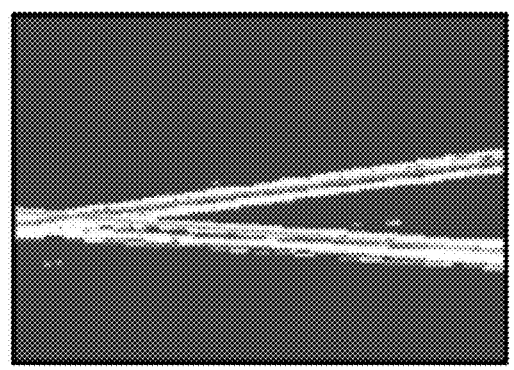
FIG. 3(B)          FIG. 3(C)

SYSTEM AND METHOD FOR DETECTING AND TRACKING AN OBJECT OF INTEREST IN SPATIO-TEMPORAL SPACE

FIELD OF THE INVENTION

The invention relates generally to an image processing system. More specifically, the invention relates to a system and method for providing a novel means for tracking an object of interest in spatial-temporal space for real time continuous operation.

BACKGROUND OF THE INVENTION

Object detection and tracking is an important but difficult task. Many automatic surveillance systems are needed to collect data for detecting objects of interest. The challenges of object detection and tracking, especially at nighttime, are mainly due to the variation, the significance and the high speed of the lighting change. Often, the area of interest is very unevenly illuminated. At places with good lighting, objects can be seen very well by a camera with night mode, except for color loss. However, at place with little or no lighting, objects (e.g., humans) without self-illumination can have very low contrast and objects (e.g. vehicles) with self-illumination can cause drastic change to the entire scene. Thermal cameras measure the surface temperature, therefore are less sensitive to lighting change. However they are expensive and do not capture the appearance information as good as a visible light camera. Therefore in most surveillance applications, a regular visible light camera (possibly with a night mode) is used for both during daytime and nighttime.

Background modeling and subtraction is a widely used approach for moving object detection and tracking. However the fast change of image gain makes it difficult to detect moving objects using the background subtraction. The appearance of the vehicle also changes significantly, thus making appearance-based tracking also less likely to succeed. Most current work of visual tracking performs detection when the object enters the scene and then performs tracking. In difficult scenario like this, the detection from a single or a small number of frames is less likely to be accurate and erroneous detection will in turn ruin the tracking.

Many techniques have been proposed for nighttime detection and tracking. Most of them make assumptions about the images, such as "hot-spot" assumption, or direct extension of the daytime algorithms. For example, the approaches in many technical papers exploit the thermal imagery property of human bodies which are hotter (or brighter) than the surrounding environment. Such papers include B. Bhanu and J. Han in "Kinematic based human motion analysis in infrared sequences", In *Proceedings of the Sixth IEEE Workshop on Applications of Computer Vision*, pages 208-212, F. Xu, X. Liu, and K. Fujimura in "Pedestrian detection and tracking with night vision", *IEEE Transaction on Intelligent Transportation Systems*, vol. 6, no. 1, pages 63-71, A. Yilmaz, K. Shafique, and M. Shah in "Tracking in airborne forward looking infrared imagery", *Image and Vision Computing*, vol. 21, no. 7, pages 623-635 and H. Nanda and L. Davis in "Probabilistic template based pedestrian detection in infrared videos", *IEEE Intelligent Vehicles Symposium*.

The common problem with the "hot-spot" assumption in the above-mentioned papers is that it is not always true in complex environment due to the temperature changes across the day or seasons of the year. To make the algorithm more reliable, various methods are proposed, including the use of support vector machines or other learning based methods such as robust background subtraction with contour completion/closing, fusion-based background subtraction using the contour saliency, the application of probabilistic templates and the W4 system employing a combination of shape analysis. However most of these approaches are for thermal images and not directly applicable to visible light cameras.

In most visual tracking work, such as the mean shift tracker as disclosed by G. Bradski in "Computer vision face tracking for use in a perceptual user interface", *Intel Technology Journal*, vol. 2, no. 2 and by D. Comaniciu, V. Ramesh, and P. Meer in "Kernel-based object tracking" *IEEE Trans. Pattern Anal. Mach. Intell.*, vol. 25, no. 5, pages 564-577, the particle filter based tracker by M. Isard and A. Blake in "Condensation—conditional density propagation for visual tracking", *Int'l Journal of Computer Vision*, vol. 29, no. 1, pages 5-28, and the Markov chain Monte Carlo method for object tracking by T. Zhao and R. Nevatia, "Tracking multiple humans in complex situations", *IEEE Trans. Pattern Anal. Mach. Intell.*, vol. 26, no. 9, pages 1208-1221, the temporal coherence information is only used in a two-frame fashion. All these methods utilize the information with spatial priority and only exploit the temporal coherence between two adjacent frames. P. Komprobst and G. G. Medioni in "Tracking segmented objects using tensor voting", In *Proc. IEEE Conf. Comp. Vision Pattern Recognition*, pages 2118-2125 used the tensor voting framework to group object trajectories in the spatio-temporal space. However it assumes that objects can be detected fairly accurately and the centroids are being grouped. Compared to smoothness constraint in tensor voting, the small field of view needs stronger model for robust result.

The most related work in detecting and tracking objects is the video retrieval using the spatio-temporal descriptors is disclosed by D. DeMenthon and D. Doermann in "Video retrieval of near-duplicates using k-nearest neighbor retrieval of spatiotemporal descriptors", *Multimedia Tools and Applications*, page in press, where spatio-temporal event volumes are extracted using a hierarchical mean shift algorithm in 7D space. However, this approach suffers from high computational complexity because it uses a 7-D approach.

So, a need exists in the art to built an improved system which overcomes the deficiencies of prior art and provides an accurate and robust detection of a moving object in real-time. There is further need in the art for the system which is insensitive to transient noise, natural handling of occlusion and convenient enforcement of physical constraints.

SUMMARY OF THE INVENTION

It is an object of the present invention to provide a method and system that overcomes the problems associated with the prior art techniques and which further increases its robustness and the quality of motion segmentation.

In one embodiment of the present invention, there is provided a method for processing incoming images in real-time. The method includes applying a change detection procedure to detect at least one change in the image and generating a 3D spatio-temporal volume of said change in the image. The method further includes converting the 3D spatio-temporal image onto a 2D spatial-temporal image using Hough Transform and extracting a 2D band in said 2D spatial-temporal image, wherein said band is a trajectory of a moving object of interest in said image.

BRIEF DESCRIPTION OF THE DRAWINGS

FIG. 2 illustrates frames of images undergoing robust change detection in accordance with an embodiment of the present invention.

FIG. 3 illustrates an initial band detection using the Hough transform in accordance with another embodiment of the present invention.

DETAILED DESCRIPTION OF THE INVENTION

The object of the present invention is attained by fully integrating spatio-temporal space to detect and track objects without favoring any one dimension over others. Much larger number of video frames is simultaneously utilized in space and time, so that evidence from space and time is gathered at the same time. Specifically, the method utilizes a 2D spatio-temporal representation of the image to meet the real-time requirement and extracts band from the 2D spatio-temporal representation using Hough transform. As used herein, the term "spatio-temporal" means time-varying or potentially time-varying across one or more spatial dimensions.

Figure 1A:
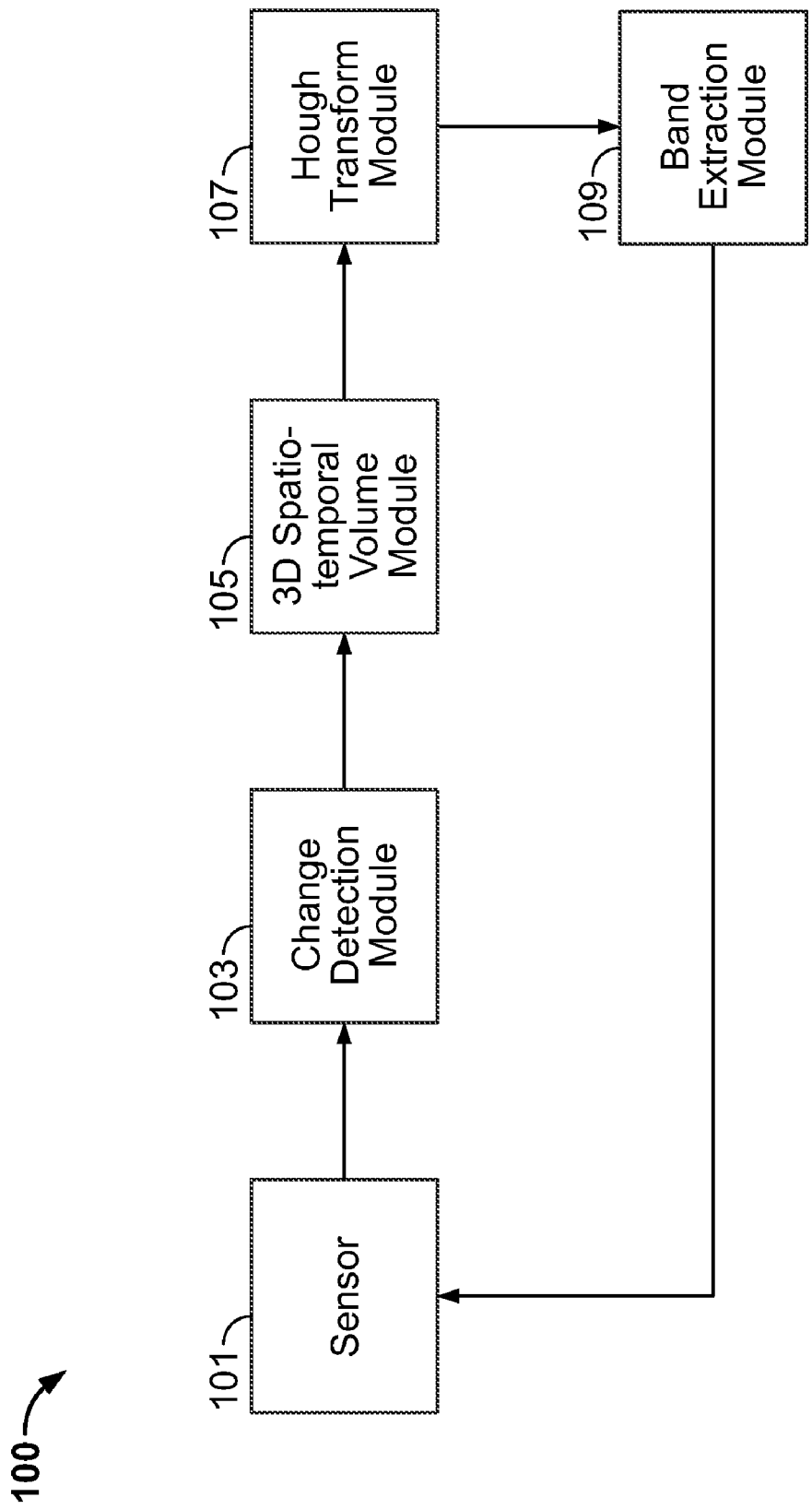
FIG. 1A illustrates a system for detecting and tracking moving objects in spatio-temporal space in accordance with an embodiment of the present invention.

Referring to FIG. 1A, there is illustrated a block diagram of a system 100 for detecting and tracking moving objects in spatio-temporal space in accordance with an embodiment of the present invention. The system includes a sensor 101 for capturing images which are further processed by a Robust Change Detection Module 103 for detecting changes in the consecutive images. The change detecting results are projected onto a dimension where there is motion to create a spatio-temporal 3D Volume by a 3D Spatio-temporal Volume Module 105. The spatio-temporal 3D volume 105, thus detects the moving object. These projections are reduced to straight lines from the 3D Spatio-temporal Volume by Hough Transform Module 107, which are further stacked over time to form a 2D spatio-temporal band. Band Extraction Module 109 further extracts the bands which are further combined in order to track the moving object of interest. The details of the elements in the system 100 are provided below.

Figure 1B:
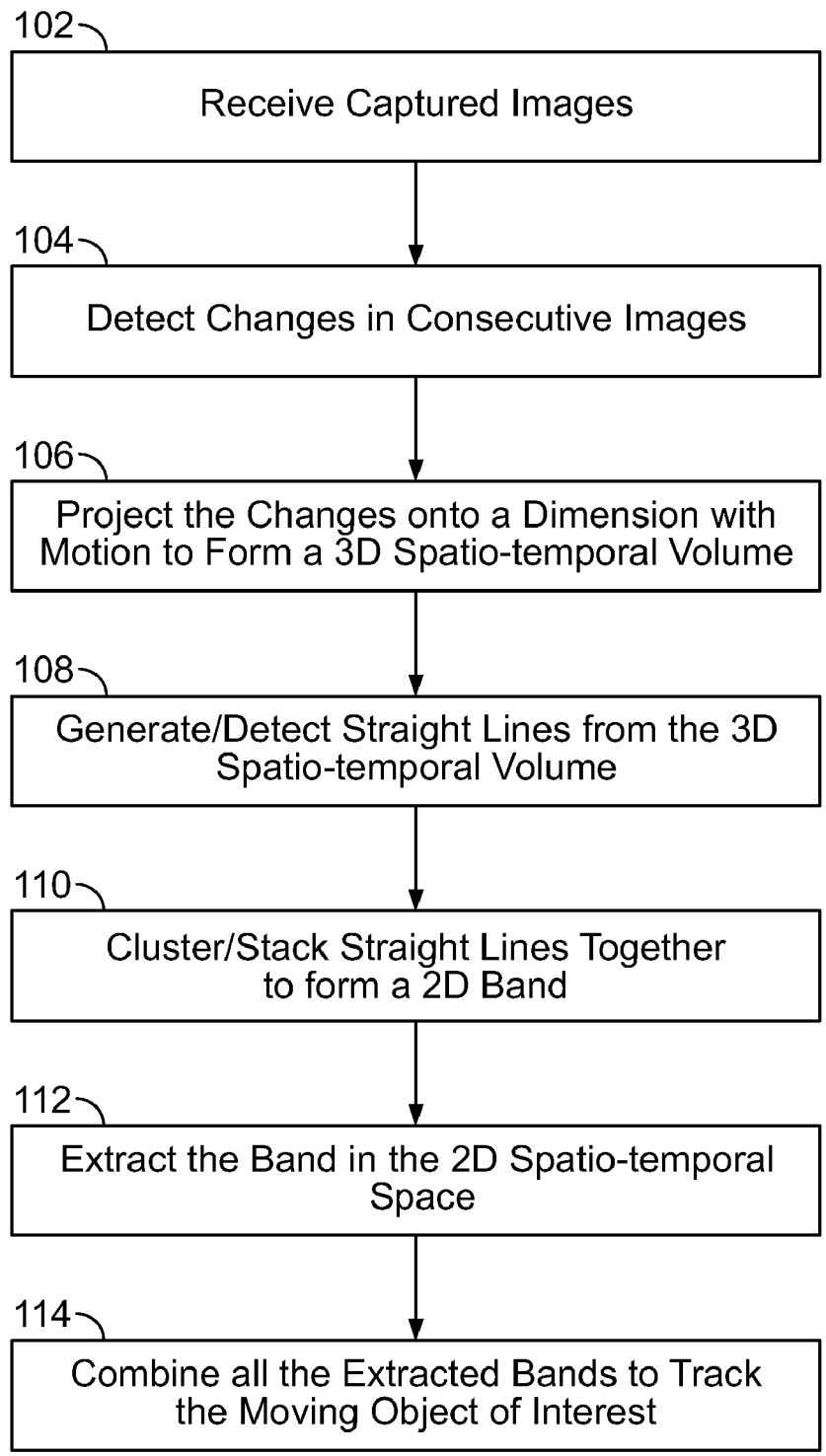
FIG. 1B illustrates a flow diagram of a method for detecting and tracking moving objects in spatio-temporal space using the system of FIG. 1A.
Figure 4A:
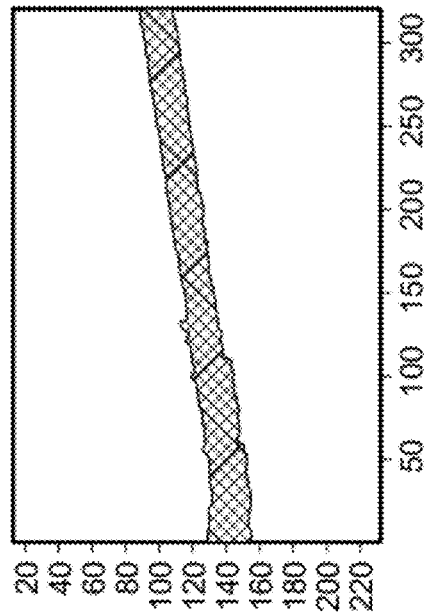
FIG. 4 illustrates a band extraction using entropy minimization in accordance with a preferred embodiment of the present invention.
Figure 4B:
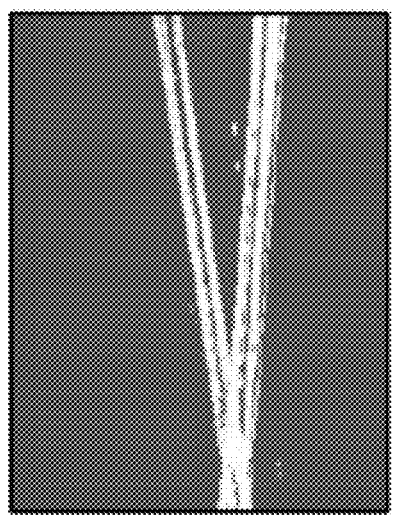
Figure 4D:
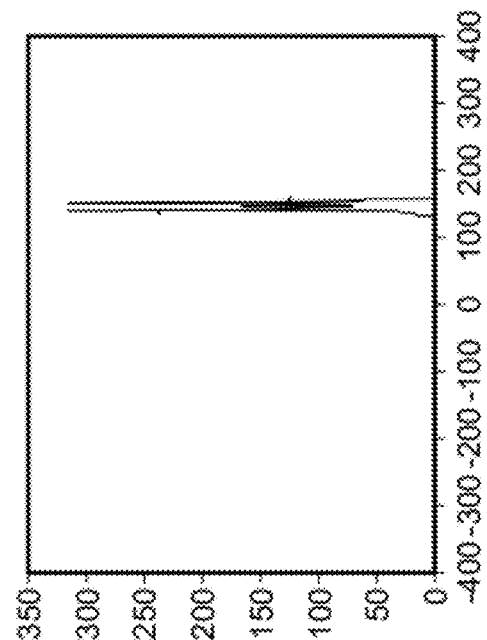
Figure 4C:
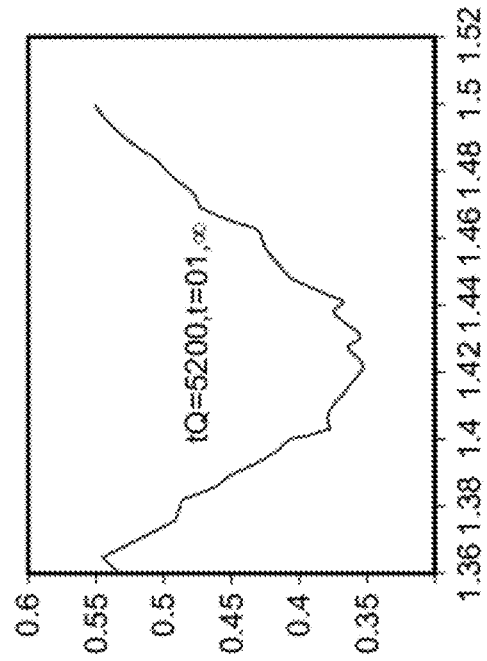
Figure 4E:
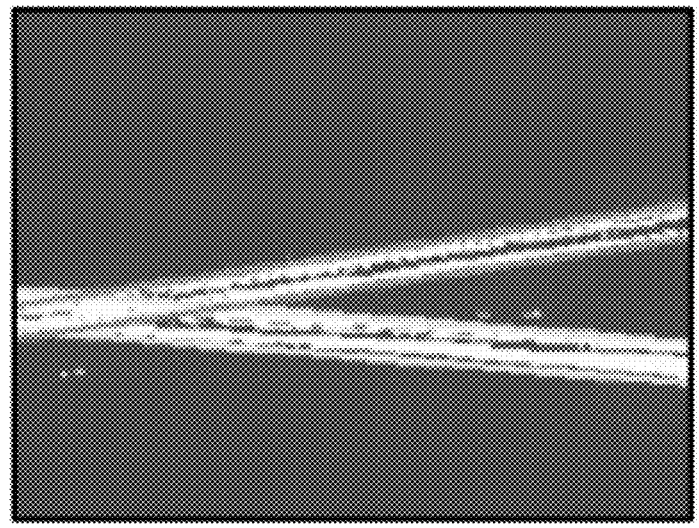
Figure 4F:
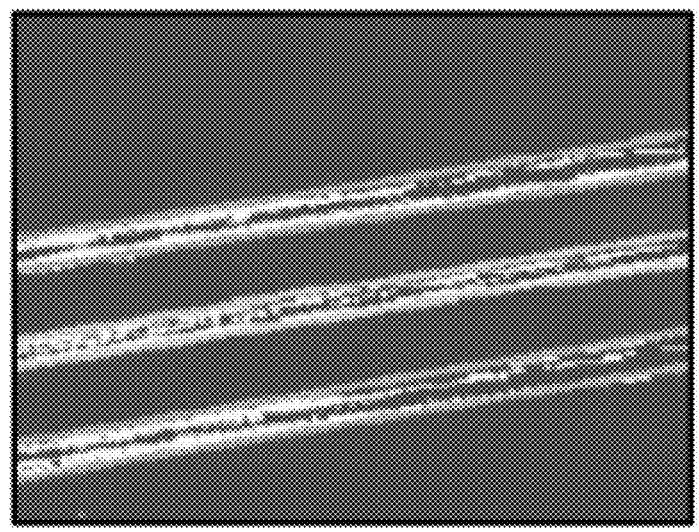

Referring to FIG. 1B, there is illustrated a flow diagram illustrating a method for detecting and tracking moving objects in spatio-temporal space using the system 100 of FIG. 1A. At step 102, the video images/frames captured by the sensor 101 are received. These frames are further processed for robust detection of the changes in the images/frames in step 104 by the Robust Change Detection Module 103, as described in greater detail herein below. The changes in images may vary based on various factors. For example, a change in the scene may be due to change in lighting over the day or wind-induced swaying of trees Robust Change Detection Due to the severe illumination variation and saturation, the commonly used methods such as background subtraction and/or normal flow are generally not suitable for motion detection, especially at the nighttime. Thus, an image differencing method is applied to the captured images/frames to detect the changes in the images by the Robust Change Detection Module 103 in accordance with a preferred embodiment of the present invention. The image difference between consecutive frames is calculated by obtaining an absolute value of the difference between two images. A large absolute value indicates potential changes in the scene.

A difference map of the absolute values of a set of frames is obtained. Then, a threshold value is calculated based on this difference map to obtain change detection result. In the preferred embodiment, a simple automatic threshold technique from robust statistics is utilized. In this technique, first a median of the absolute value of difference is obtained $$MED=\text{median}(|I_t - I_{t-1}|) \quad (1)$$

and the median absolute deviation $$MAD=\text{median}(|||It|I_t - I_{t-1}| - MED|), \quad (2)$$

where $I_t$ is the image frame at time t. From the experiments, a suitable threshold is chosen at $$T=MED+3 \times 1.4826 \times MAD+30, \quad (3)$$

where 1.4826 is a normalization factor from robust statistics and 30 is a constant factor to remove the background noise.

The change detection consists of pixel wise differencing of consecutive frames to create a 2D difference map of each fame. Then this difference calculated at each pixel (difference map) is compared to the above calculated threshold value to detect change in the image, i.e. declare change only where the difference exceeds a certain threshold.

The change detection results after the above threshold procedure is in general broken and corrupted by salt and pepper noise. Salt and pepper noise is random, uniformly distributed small noisy elements often found corrupting real images. It appears as black dots or small blobs on a white background, and white dots or small blobs on the black object. Thus, in a preferred embodiment, a compact 5×5 morphological close operator is applied to the binarized image difference to filter the noise and extract the region of interest. Morphological operators often take a binary image and a structuring element as input and combine them using a set operator (ex. intersection, union, inclusion, complement). They process objects in the input image based on characteristics of its shape, which are encoded in the structuring element. More details of the morphological operator can be found in the disclosure by R. C. Gonzalez and R. E. Woods, in "Digital Image Processing".

Referring to FIG. 2 there are shown the examples of the robust change detection from video sequences. FIG. 2a shows the original image captured by the camera. FIG. 2b shows the undistorted image which includes undoing the optical distortion of the original image introduced by wide-angle camera capture. This is generally done by using the calibrated camera model. FIG. 2c shows the image difference calculated in step 104 by the robust change detection module 103 without using the morphological close operator and FIG. 2d shows the image difference after applying the morphological close operator to remove any noise on the image.

Spatio-Temporal Segmentation

Upon obtaining the initial change detection result in each individual consecutive frame at step 104, object tracks from the video sequences are generated, where the temporal coherence provides important information about the objects. As used herein, the term "spatial coherence" describes the consistency between signals at different points in space and the term "temporal coherence" describes the consistency between signals observed at different moments in time. In other words, if a certain group of pixels is correlated frame to frame, then it is a coherent group of pixels.

Most existing approaches handle the spatial (space) dimension and the temporal (time) dimension separately. Some of them totally discard the temporal information. Others utilize the temporal information by filtering, such as Kalman filter prediction, particle filter based tracking, or mean shift tracking. All these methods only directly use the temporal coherence information between two adjacent frames, which can be easily corrupted by the noise and occlusions.

In order to more effectively utilize the temporal coherence information, the present invention executes the segmentation of the object in the spatio-temporal space which is produced by stacking the individual consecutive video frames. The moving objects in the video sequences generate spatio-temporal volumes. Then object detection and tracking is equivalent to the task of space-time volume extraction. A moving object may have an arbitrary trajectory. However, a vehicle tends to travel linearly in the spatio-temporal space. Therefore, the projection of the 3D Volume turns out to be a band, i.e. a two-dimensional strip.

In order to meet the real-time requirement, the computation complexity of band extraction needs to be reduced. One way to achieve this is to project the 3D spatio-temporal onto a 2D spatial temporal band. First, the difference images calculated at step 104 is projected onto the dimension where there is motion (horizontal direction in this example) to form a spatio-temporal 3D volume in step 106 by the 3D Spatio-temporal Volume Module 105.

Then, using the Hough Transform Module 107, the 3D Volume is reduced/generated into straight lines at step 108. These straight lines are then stacked over time in step 110 to generate/form a 2D band. Each pixel (x, t) in the 2D spatio-temporal space maps the projected value at horizontal position x at time t. So, when a vehicle enters and then exits the scene, it generates a spatio-temporal volume in 3D space because of space and time continuity. However, in 2D spatio-temporal space, it is reduced to a band, i.e. a two dimensional strip. This 2D Band is further extracted for one dimensions at step 112 by a robust method, e.g., the Hough transform and an entropy minimization method as will be described in greater detail below. At this stage, the moving object is located. After the object is located in one dimension, step 112 is repeated for all other dimensions only within the object range. Finally all the extracted bands are combined to track the moving object at step 114.

Band Detection

As discussed above, in order to reliably detect the bands of the moving objects in the 2D spatio-temporal space, first a Hough transform is used to detect the straight lines, which are then clustered/stacked to individual bands. Hough transform is a well known global method for detection of lines or other geometric primitives. It has been widely used in many vision applications due to its robustness and simplicity as disclosed by P. Hough in U.S. Pat. No. 3,069,654 and by R. O. Duda and P. E. Hart in "Use of the hough transformation to detect lines and curves in pictures", *Common, ACM*, vol. 15, no. 1, pages 11-15.

In the algorithm provided below, the standard Hough transform is employed, which uses the normal parametric representation of a line:

$$p = x \cos\theta + y \sin\theta, \qquad (4)$$

where p is the distance from the origin to the line along the normal vector perpendicular to the line, θ is the angle between the x-axis and this normal vector.

Since a standard Hough transform is directly applied to the 2D spatio-temporal images, there are usually multiple detections of lines since the bands are in general thick and dense. To remove these multiple detections of lines, the lines are combined close enough to form a group of individual bands. If the distance between two lines is smaller than a threshold (where the distance is defined as the maximum of the distances between two pairs of intercepting points at x=0 and x=image width), then those two lines are grouped into individual bands as shown in FIG. 4 of the present application. In practice this criteria works well since the bands differentiate themselves enough with the help from spatio-temporal coherence. FIG. 3 illustrates initial band detection using Hough transform with FIG. 3a illustrating Hough space and detected peaks, FIG. 3b detecting lines highlighted on the input image and FIG. 3c illustrating lines after clustering. Each peak corresponds to a line in image space as per the definition of the Hough transform As discussed above, the lines within the same band are combined together to generate a band which is described by the minimal distance, the maximal distance and the angle. As discussed above, after the bands are extracted for all the other dimensions within the object range, all the extracted bands are combined to track the moving object of interest at step 114.

Band Refinement

Although the band detection and segmentation using the Hough transform is reliable and robust, the accuracy of the band segmentation may preferably be further enhanced/refined by the using entropy minimization in accordance with a preferred embodiment of the present invention. The details of the entropy minimization are described herein below.

For each band candidate from Hough transform, there is a need to find an optimal orientation and boundary of the band. The optimal projection direction of the points is computed by an entropy-based criterion. Unlike other approaches to compute orientation, this criterion is in-sensitive to outliers and noise in the data and is not affected by asymmetry of the data.

Suppose the ith line within a band detected by Hough transform is $$y_i = w^T x_i$$

where w is the normal vector and a set of data points are $x_1 \ldots x_n$. One needs to compute the optimal projection direction w, which minimizes the entropy of the projected histogram on direction w. The histogram is denoted as $$p(w) = \{p_{u(w)}\}_{u=1\ldots m}7$$

where $pu() = c\sum^n_{i=1} 6[b(w^T \cdot x_i) - u]$, $\sum^m_{u=1} P_u(w) = 1$, and b( ) is a function to convert a value to its bin number. The entropy of the projected histogram is $$Ent(w) = Ent(p(w)) = -\sum_{U=1}^{m'} pu(w)\log(pu(w))$$

So, starting from the initial value of w found by the Hough transform, search is carried out around the initial value to find the minima of the entropy. Alternatively, gradient-based method can also be used to replace the search. Once the band normal direction w is obtained, the boundary of band along the normal direction is computed by using an empirically defined threshold.

Referring to FIG. 4, there is illustrated the band extraction using entropy minimization. FIG. 4a shows a 2D spatio-temporal plot of two vehicles passing by, which is similar to FIG. 3c. However, the bands detected by Hough Transform are further refined using entropy minimization. This refining begins in FIG. 4b where points belonging to one band candidate are detected. FIG. 4c shows an entropy function with respect to the angle of bands. Minima of the entropy function are found out and corresponding angle is the band angle, FIG. 4d illustrates the projected histogram of points along the normal direction of the bands. Stars mark the detected boundary of the band. FIG. 4e shows final extracted bands after entropy minimization. In other words, first bands are identified from the 2-D image in FIG. 4b. Next, an entropy function is computed in FIG. 4c with the respect to the angle of the bands and the minima of this function are identified. The angle corresponding to the minimum is identified as the band angle in FIG. 4d. This process is repeated for the all the bands with final extracted bands shown in FIG. 4e. FIG. 4f show final extracted bands for another example where three vehicles moving parallel to each other.

Band Filtering and Pruning

To further improve the performance, the band extraction results in the image are verified and multiple conditions are also used to filter and prune the results in accordance with a preferred embodiment of the present invention.

The first condition used to filter out the false detection is the angle of lines or bands, since it corresponds to the vehicle moving speed. It should not be equal to 0 or $\pi/2$, because the bands with angle 0 correspond to vehicles moving with infinity speed or sudden switching states of the camera. The bands with angle $\pi/2$ correspond to stationary vehicles which can be filtered out. Additionally, reasonable assumption is made about the range of vehicle speed, which further filters out the false detection.

The second condition used to verify the bands is that the number of pixels within each band should exceed a certain amount and the density of pixels with each band should exceed a certain threshold. The thresholds used to prune out the false detection are set to be relatively low in order to keep all correct detections.

The third condition used to verify the bands is the uniformity of the bands. The assumption is that the pixels within a valid band should be uniformly distributed in the bands. The uniformity is measured preferably using the chi-square test as follows by W. Press, S. Teukolsky, W. Vetterling, and B. Flannery in "Numerical Recipe Recipes in C++: the Art of Scientific Computing", *Cambridge University Press*. Suppose that $N_i$ is the number of pixels observed in the ith bin, and that n2 is the number expected according to uniform distribution. Then the chi-square is $$x^2 = \sum_i \frac{(Nx - n:)2}{n_i} \quad (5)$$

A large value of $x^2$ indicates that the pixels within the band are not likely uniformly distributed.

Experiments and Evaluation

The method as described in the present invention has been tested in the context of preferably a 33-camera network. All the cameras are desirably installed a few meters away from the road and monitor the traffic in dual directions. In generally, about ten or more different cameras were selected to test the algorithm to preferably cover a wide variety of imaging conditions and maximize challenge. Each of the sequences lasts about 15 minutes with approximately 40-50 vehicles passing by. Initially, image distortion from the video sequence is removed, which makes the roads in the image straight. Both the quantitative evaluations of detection and localization accuracy of the inventive method are provided in greater detail herein below.

Evaluation on Detection Rate

The detection performance of the inventive method is quantatively evaluated preferably on six sequences. False detection rate, multiple detection rates and missed detection rate of the results are computed. The results are compared with another tracking method based on optical flow. The optical flow based method, as known in the art, first applies robust change detection and then associates the detections between adjacent frames by robust optical flow. The evaluation numbers of the two methods are reported in Table 1. It can be seen that the improvement of the method of the present invention over the optical flow based method is significant, especially for sequence twelve where the illumination condition is the worst.

It should be noted that by observing the tracking results of the optical flow based tracker, most of the errors are due to erroneous object instantiation when the object first enters the scene. However, in the present invention since the object is observed across several frames before declaring its existence, it allows to smooth out errors caused by instantaneous object detection. In other words, unlike prior art techniques that are likely to fail by instantaneous mistakes, an object has to result in a band before it will be declared as an object as disclosed in the present invention.

TABLE 1

Performance comparison on detection between the current method and the optical flow based method.

| | Seq. no. | | | | | |
|---|---|---|---|---|---|---|
| | 1 | 2 | 4 | 8 | 10 | 12 |
| Result of optical flow based method | | | | | | |
| Mul-D (%) | 10.6 | 0 | 5.4 | 5.5 | 5.2 | 40.4 |
| FD (%) | 0 | 2.7 | 1.4 | 0 | 0 | 5.8 |
| Mis-D (%) | 3 | 0 | 0 | 0 | 0 | 3.8 |
| Result of the inventive method | | | | | | |
| Mul-D (%) | 2.38 | 0 | 0 | 1.92 | 0 | 0 |
| FD (%) | 0 | 0 | 1.33 | 0 | 2.38 | 4.00 |
| Mis-D (%) | 2.38 | 0 | 0 | 0 | 2.38 | 2.00 |

Mul-D = multiple detection rate,
FD = false detection rate,
Mis-D = missed detection rate.

Evaluation of Localization Accuracy

As mentioned above, the localization accuracy of the inventive method is also quantitatively evaluated. The bounding box of four sequences of images is manually groundtruthed, i.e. the boxes are manually segmented based on the image collected "on location", and then compared with the output of the tracker results of the present invention. Several parameters such as overlap rate (OR), centroid error rate (CE) and horizontal (HE)/vertical size error (VE) rate are defined as the evaluation metrics. The overlap rate is the ratio of the overlap box size to the square root of product of the two box sizes. The centroid error rate is the centroid distance normalized by the size of the vehicle. The horizontal/vertical size error rate is the error in width and height of the vehicle normalized by the ground truth width and height. The evaluation results of the present invention are reported in Table 2.

The manually segmented ground results (not shown) would correspond to approximately 100% accuracy with 100% overlap rate and approximately 0% centroid error rate and horizontal/vertical error rate. Thus, compared to the manually segmented ground results, it is obvious that localization is fairly accurate given the challenges of the data.

|        | Seq. no. |        |        |        |
|--------|----------|--------|--------|--------|
|        | Seq. 1   | Seq. 2 | Seq. 4 | Seq. 8 |
| OR (%) | 84.50    | 82.10  | 90.18  | 82.02  |
| CE (%) | 8.11     | 6.25   | 7.67   | 9.74   |
| HE (%) | 6.96     | 5.56   | 7.56   | 8.92   |
| VE (%) | 10.97    | 6.19   | 6.08   | 11.15  |

Figure 5:
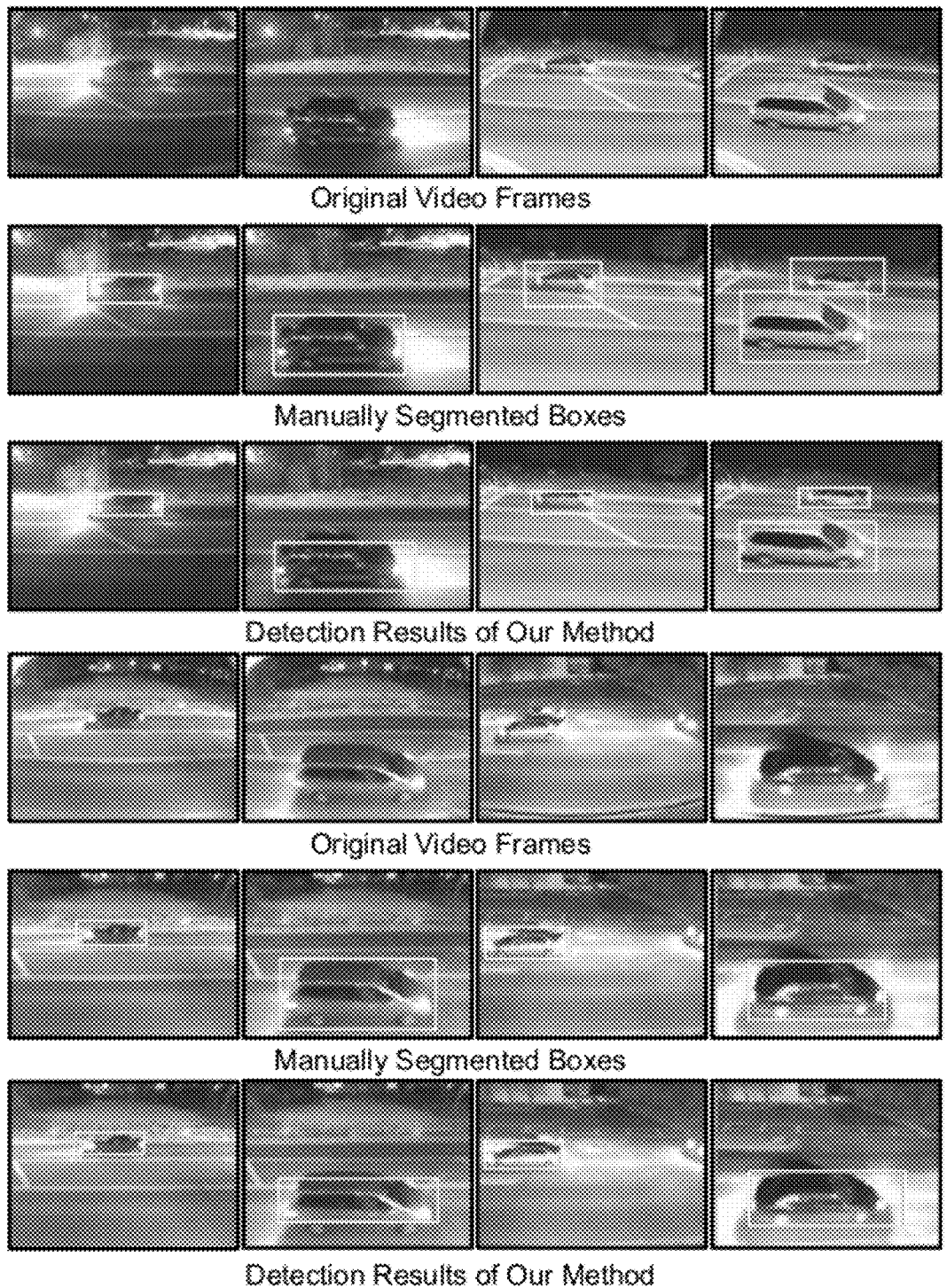
FIG. 5 illustrate exemplary images to provide comparison of the object detection and tracking results of the inventive method with the prior art.
Figure 6:
FIG. 6 illustrate exemplary images of nighttime detection and tracking results of the present invention.
Figure 7:
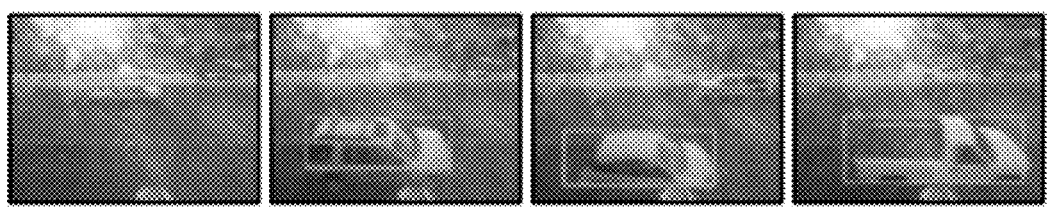
FIG. 7 illustrate exemplary images of daytime detection and tracking results of the present invention.

Some samples of the detection and tracking results using the inventive method of the present invention and the manually segmented results are illustrated in FIG. 6. As illustrated in FIGS. 5a and 5d, are the original video frames, 5b and 5e are manually segmented bases and 5c and 5f are the detection results of the present invention. From the results, it is obvious that the detection results are consistent with the ground truth. Some detection results of challenging night-time sequences of the present invention without ground truth are illustrated in FIG. 6. Some of the challenges at the night time are due to poor illumination conditions and the drastic changes in images caused by the headlights and taillights of the vehicle. Further, detection results with less challenging daytime sequences are shown in FIG. 7. Also, shown is a result on one difficult daytime sequence 3 (Seq 3) in FIG. 7 where the sun shines directly into the camera in the late afternoon causing low contrast of the vehicle against the surrounding background. Thus, it is very apparent from these images that the present invention approach can very accurately detect, track and localize the moving objects in the image.

Figure 8:
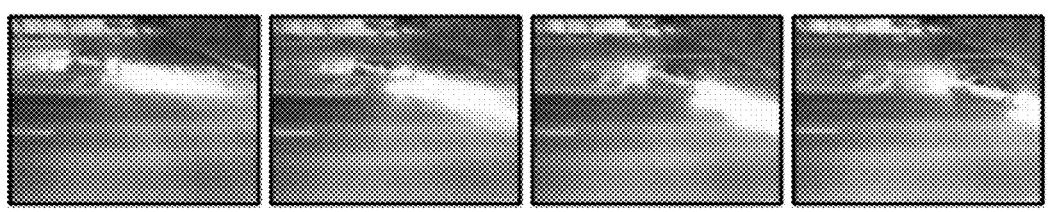
FIG. 8 illustrate exemplary images of the nighttime detection and tracking results with non-straight trajectory.

Although, the inventive method of the present invention as described above is based on the straight trajectory (i.e. object travel along a straight line at constant speed) of vehicles in the spatial-temporal space, one skilled in the art would appreciated that the inventive method could be similarly applied for non-straight trajectory. FIG. 8 shows one of such example of the detection and tracking results with non-straight trajectory, where the vehicle merges onto the main road and accelerates at a different angle. More complex model such as quadratic curves should preferably be used to extract the curved bands for highly curved trajectory.

The present invention provides for a novel system and method for detecting and tracking objects using spatio-temporal representation. One of the advantages of this spatio-temporal representation includes analyzing all the video frames corresponding to an object together instead of processing individual frames separately. The strong temporal correlation across the consecutive frames accumulates much more salient evidence about the targets when each individual frame is weak, thus making the results more robust. The Hough transform and projection pursuit by the entropy minimization is combined to provide for band extraction. Once the spatio-temporal bands are extracted, the objects in the video sequences are accurately and robustly identified. Other advantages of the inventive approach include insensitive to transient noise, natural handling of occlusion and convenient enforcement of physical constraints such as object size and object speed.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. A method for processing incoming images in real-time, the method comprising:
    applying a change detection procedure to detect at least one change in the image;
    generating a 3D spatio-temporal volume of said change in the image;
    converting the 3D spatio-temporal volume onto a 2D spatial-temporal image using Hough Transform; and
    extracting a 2D band in said 2D spatial-temporal image, wherein said band is a trajectory of a moving object of interest in said image.

2. The method of claim 1 wherein said converting comprises reducing said 3D spatio-temporal volume into straight lines and clustering said straight lines to form the 2D band.

3. The method of claim 1 further comprising combining the extracted 2D bands from all the incoming images to track the moving object of interest.

4. The method of claim 1 wherein said change detection procedure comprises calculating image difference between two consecutive images.

5. The method of claim 4 wherein said generating comprises projecting the image difference onto a dimension where there is motion to generate the 3D spatio-temporal image, wherein said 3D spatio-temporal image comprise at least said moving object.

6. The method of claim 4 further comprising filtering said calculated image difference.

7. The method of claim 1 further comprising refining said extracted 2D band.

8. The method of claim 7 wherein said refining is based on entropy minimization.

9. The method of claim 1 further comprising filtering said extracted 2D band.

10. A system for processing incoming images in real-time, the method comprising:
    a change detection module to detect at least one change in the image;
    a 3D spatio-temporal module for generating a 3D spatio-temporal volume of said change in the image;
    a Hough Transform module for converting the 3D spatio-temporal volume onto a 2D spatial-temporal band; and
    a Band extraction module for extracting the 2D spatial-temporal band, wherein said band is a trajectory of a moving object of interest in said image.

* * * * *